United States Patent [19]

Smith

[11] 4,037,855
[45] July 26, 1977

[54] BICYCLE WITH SHOCK ABSORBING FRONT END

[76] Inventor: Melvin Smith, 1040 Oak, Apt. No. 4, San Francisco, Calif. 94117

[21] Appl. No.: 606,199

[22] Filed: Aug. 20, 1975

[51] Int. Cl.² .......................................... B62K 21/20
[52] U.S. Cl. ..................................................... 280/276
[58] Field of Search ............... 280/276, 277, 284, 285, 280/286, 289

[56] References Cited

U.S. PATENT DOCUMENTS

| 644,787 | 3/1900 | Williams | 280/284 |
|---|---|---|---|
| 1,606,093 | 11/1926 | Mohin | 280/285 |
| 2,325,561 | 7/1943 | Weber et al. | 280/284 |
| 2,629,193 | 2/1953 | Hughes | 280/289 |

FOREIGN PATENT DOCUMENTS

| 982,876 | 6/1951 | France | 280/276 |
|---|---|---|---|
| 1,064,015 | 5/1954 | France | 280/276 |
| 1,083,682 | 12/1953 | Germany | 280/276 |
| 264,593 | 9/1913 | Germany | 280/276 |
| 520,855 | 5/1940 | United Kingdom | 280/277 |
| 19,956AD | 1910 | United Kingdom | 280/277 |
| 9,052AD | 1911 | United Kingdom | 280/277 |
| 219,455 | 7/1924 | United Kingdom | 280/276 |
| 330,648 | 6/1930 | United Kingdom | 280/276 |

Primary Examiner—Philip Goodman
Assistant Examiner—Jack D. Rubenstein
Attorney, Agent, or Firm—Allen D. Brufsky

[57] ABSTRACT

Attached to the steering post of a bicycle is a lower extension cylinder in which a piston attached to the front fork assembly is slidably mounted.

Upper and lower coil springs are positioned in the cylinder to springingly resist upward and downward motions of the piston. The piston is connected to the upper portion of the front fork assembly by an integral neck portion which extends from the side of the piston through a slot in the front of the cylinder.

The upper portion of the fork is vertically oriented so that the piston can slide vertically in the cylinder, thereby to absorb shocks with maximum effect. The lower tine portions of the front fork are bent forward toward the horizontal so that the ends thereof are oriented to hold the front wheel's axle in proper location and to resemble a modified, easy-rider type motorcycle. A license plate support arm and bracket extend upwardly from the rear fork to add to the motorcycle appearance.

3 Claims, 3 Drawing Figures

U.S. Patent  July 26, 1977  4,037,855
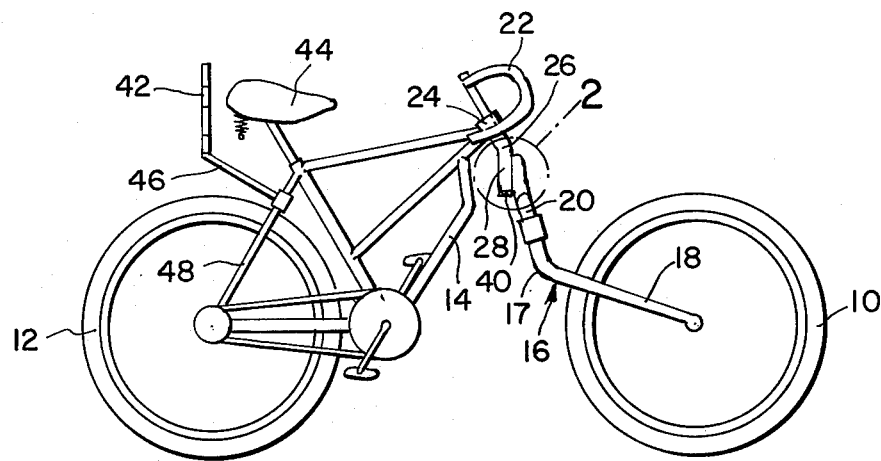
Fig. 1
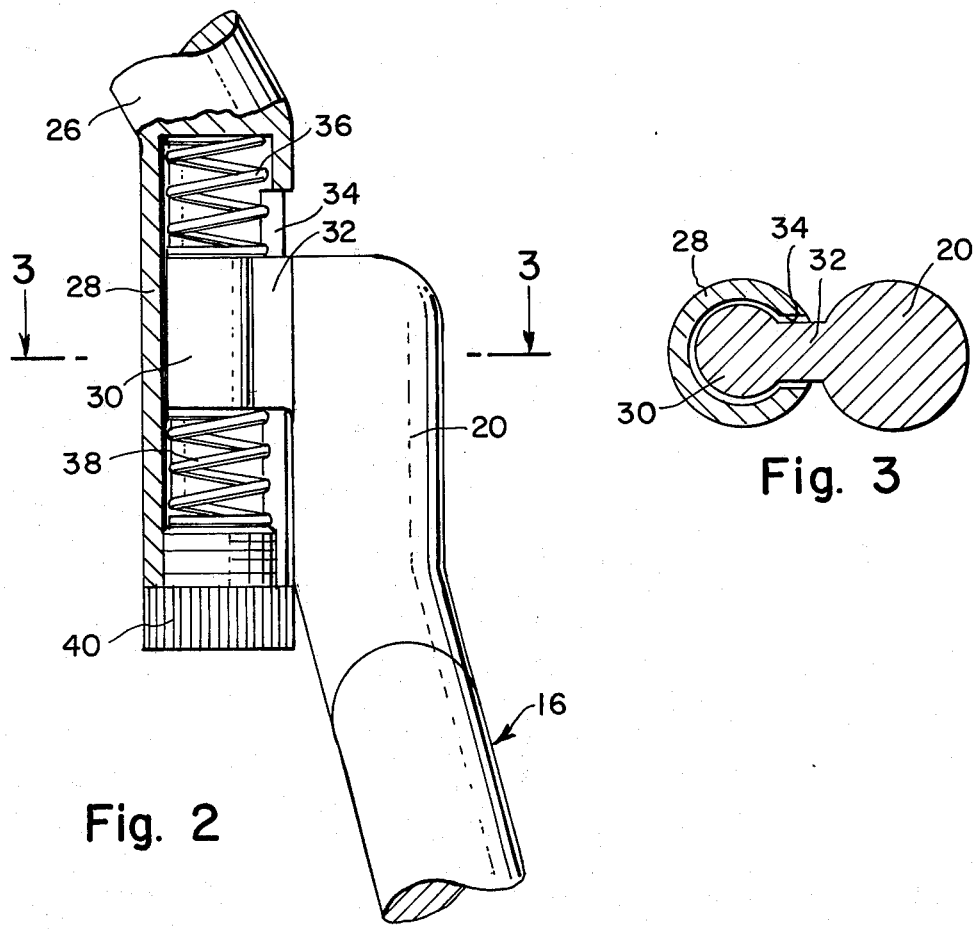
Fig. 2
Fig. 3

BICYCLE WITH SHOCK ABSORBING FRONT END

BACKGROUND — FIELD OF INVENTION

This invention relates to bicycles and particularly to a bicycle which has a motorcycle appearance and associated improved riding qualities.

DESCRIPTION OF PRIOR ART

Present bicycles have a rigid frame which transmits shocks and bumps to the rider, thereby providing a relatively rough ride. Such bicycles have a conventional appearance. Several objects of the present invention therefore are to provide a bicycle with a springly cushioned ride and a non-conventional, motorcycle-like appearance. Further objects and advantages will become apparent from a consideration of the ensuing description.

DRAWINGS

FIG. 1 is a side view of a bicycle according to the invention.

FIG. 2 is a detailed partial section view of the portion of FIG. 1 within circle 2.

FIG. 3 is a sectional view taken along the line 3—3 of FIG. 2.

DESCRIPTION

The bicycle of FIG. 1 comprises the usual front and rear wheels 10 and 12 rotatably mounted at opposite ends of frame 14. Front wheel 10 is rotatably mounted in the ends of a front fork assembly which is bent at 16 to have a generally horizontally-oriented lower portion 18 and a generally vertically-oriented upper portion 20. The handlebars 22 are connected to a steering shaft which is pivotably mounted in a steering post tube 24. The lower end 26 of the steering shaft is connected to a lower extension cylinder 28 which rotates with the steering shaft. The steering shaft is tilted backwardly and cylinder 28 is substantially vertically oriented, the portion where the shaft is joined to the cylinder being bent slightly as indicated.

FIG. 2 is a detailed partially sectional view of lower extension cylinder 28 and FIG. 3 is a sectional view along line 3—3 of FIG. 2. As indicated in FIG. 2, cylinder 28 contains a piston extension 30 which is joined to upper portion 20 of front fork assembly 16 by an integral neck portion 32. Neck portion 32 extends through a slot 34 in the front of cylinder 28.

As indicated in FIG. 3, he diameter of piston 30 is larger than the width of slot 34 so that piston 30 is locked within cylinder 28 and the width of neck portion 32 is almost equal to that of slot 34 so that the integral piston-neck-upper portion 30-32-20 will turn tightly with and in response to rotation of cylinder 28. The height of slot 34 is about twice that of neck portion 32 so that neck 32 and piston 30, along with fork assembly 16, can move vertically in slot 34 and cylinder 28. Upper and lower heavy coil springs 36 and 38 are positioned above and below piston 30 and the upper and lower ends of cylinder 28, respectively.

The piston-neck-upper arm assembly 30-32-20 is inserted in cylinder 28 from the lower, open end thereof, whereafter a cap 40 is threadedly engaged into such open end to lock the components together. Slot 34 extends to the bottom of cylinder 28 to enable such assembly.

Referring again to FIG. 1, a license plate mounting bracket 42 is mounted behind the bicycle's seat 44 by means of a support arm 46 which is joined to a rear strut 48. Bracket 42 also may have reflectors around the periphery thereof.

OPERATION

During use of the bicycle, when bumps or irregularities are encountered on the riding surface, they are transmitted from front wheel 10 to fork assembly 16, neck 32, and piston 30, and then to upper and lower springs 36 and 38 which springly cushion the ride by absorbing energy of the shock, thereby to reduce their effect on the rest of the bicycle and the rider. Since the upper portion 20 of the fork is oriented to slide vertically within cylinder 28, the vertical, most deleterious, component of the shocks is accommodated with maximum efficacy. The lower portion 18 of fork assembly 16, i.e., the two tines thereof, are bent forward toward the horizontal so that the ends thereof will hold the front wheel in the proper position. Also the forward bend of fork assembly 16 provides styling so that the appearance of the bicycle resembles that of a modified, easy-rider type motorcycle. The motorcycle appearance is enhanced by the provision of the license plate bracket assembly 42-46 behind rear seat 44.

While the foregoing description contains many specificities, these should not be construed as limitations of the scope of the invention, but rather as an exemplification of the preferred embodiment thereof. The true scope of the invention should be construed according to the appended claims and their legal equivalents.

I claim:

1. A bicycle of the type comprising a frame and front and rear wheels rotatably mounted in said frame, said frame including handle bars and a fork assembly connected to said handle bars, said front wheel being rotatably mounted at an end of said fork assembly remote from said handle bars, said handle bars and fork assembly being pivotably mounted in said frame such that rotation of said handle bars with respect to the rest of said frame will rotate said fork assembly and front wheel with respect to said frame, characterized in that said handle bars are connected to a front steering post having a substantially vertically-oriented cylinder at the lower end of said steering post, said cylinder forming a continuous downwardly extending portion of said front steering post, said steering post and said cylinder being pivotable with said handle bars, said cylinder having a piston member slidably mounted in said cylinder and a pair of coil springs of substantially equal strength positioned in said cylinder above and below said piston member, respectively, said cylinder having upper and lower end members to confine said springs in said cylinder and adjacent the upper and lower surfaces of said piston member, respectively, said cylinder having a single vertically-oriented slot in a front side thereof, said piston member having a neck extension thereon extending from a front side of said piston and through said slot in said cylinder, an end of said neck extension remote from said piston being joined to an upper portion of said front fork assembly said neck extension and said slot being dimensioned to provide contact surfaces for the transmission of rotational forces imparted on said steering post and being transmitted by said slot to said neck extension for controlling the steering of said front fork assembly, such that vertical shocks communicated to said front wheel and fork assembly due to road irregularities encountered by said bicycle will be springly cushioned by said pair of springs, yet said front wheel will be pivoted in response to rotation of said handle bars due to rotational force transmitted by said cylinder and the sides of said slot thereof against said piston extension.

2. The bicycle of claim 1 where said fork assembly has substantially straight upper and lower portions which are joined at an obtuse angle.

3. The bicycle of claim 1 wherein said coil springs are positioned freely in said cylinder without attachment to said cylinder, the ends thereof, or said piston, and are retained in said cylinder solely by the confinement from said cylinder, the ends thereof, and said piston.

* * * * *